(12) United States Patent
Nunes et al.

(10) Patent No.: US 11,938,776 B1
(45) Date of Patent: Mar. 26, 2024

(54) MULTIPLE MODEL ACTIVE SUSPENSION CONTROL

(71) Applicant: Zoox, Inc., Foster City, CA (US)

(72) Inventors: Alexandre Nunes, San Carlos, CA (US); Johannes Edren, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 228 days.

(21) Appl. No.: 17/671,256

(22) Filed: Feb. 14, 2022

(51) Int. Cl.
*B60G 17/0165* (2006.01)
*B60G 17/018* (2006.01)

(52) U.S. Cl.
CPC ..... *B60G 17/0165* (2013.01); *B60G 17/0182* (2013.01); *B60G 2400/821* (2013.01); *B60G 2600/172* (2013.01); *B60G 2600/182* (2013.01); *B60G 2600/1874* (2013.01)

(58) Field of Classification Search
CPC .......... B60G 2600/1874; B60G 17/016–0165; B60G 17/0182; B60G 2400/80–824; B60G 2600/17–172; B60G 2600/18; B60G 2600/182; B60G 2600/1871
See application file for complete search history.

(56) References Cited

U.S. PATENT DOCUMENTS

| | | | |
|---|---|---|---|
| 11,326,985 B2 | 5/2022 | Zhao et al. | |
| 11,453,387 B1 | 9/2022 | Huennekens et al. | |
| 2002/0130593 A1 | 9/2002 | Lee et al. | |
| 2018/0194286 A1 | 7/2018 | Stein | |
| 2022/0161781 A1* | 5/2022 | Gupta | B60W 10/22 |
| 2023/0176557 A1 | 6/2023 | Cella et al. | |

FOREIGN PATENT DOCUMENTS

| | | |
|---|---|---|
| CN | 108248325 A | 7/2018 |
| CN | 108909705 A | 11/2018 |
| CN | 109109601 A | 1/2019 |
| CN | 110154666 A | 8/2019 |
| CN | 110673480 A | 1/2020 |
| EP | 3502711 | 6/2019 |
| JP | 2005145312 A * | 6/2005 |

OTHER PUBLICATIONS

Office Action for U.S. Appl. No. 17/671,217, dated Oct. 6, 2023, Nunes, "Updating Vehicle Models for Improved Suspension Control", 8 Pages.
Office Action for U.S. Appl. No. 17/671,295, dated Sep. 22, 2023, Nunes, "Active Suspension System Using Modal Expansion", 6 pages.

* cited by examiner

*Primary Examiner* — Hung Q Nguyen
*Assistant Examiner* — Mark L. Greene
(74) *Attorney, Agent, or Firm* — Lee & Hayes, P.C.

(57) ABSTRACT

An active suspension control system for a vehicle includes a mathematical model based on a modal expansion of the vehicle. Model parameters of the vehicle can be extracted from the modal expansion using sensor data generated on the vehicle, e.g., on demand and/or in real time. The model parameters and the modal expansion can be used to determine a vehicle state, predict future vehicle states, and control aspects of an active suspension system based on the predicted future vehicle states. The model parameters may also be used to update the mathematical model, e.g., to account for component wear over time, and/or to detect anomalies or defects in the active suspension system.

20 Claims, 5 Drawing Sheets

MULTIPLE MODEL ACTIVE SUSPENSION CONTROL

BACKGROUND

Vehicles may include a suspension system to enhance the comfort of passengers of the vehicle or improve the performance of the vehicle as it travels across uneven surfaces and maneuvers through curves. A suspension system may include assemblies at each wheel of the vehicle including a spring to reduce the force transferred to a chassis of the vehicle as the vehicle travels across a depression or over bump in the surface, and/or a damper to control oscillations or rebound of the spring as it reacts to the force input. In a passive suspension system, the spring and damper react to the energy transmitted to the spring and damper as the wheel travels across the uneven surface and/or around a turn. In a semi-active or active suspension system, the spring and/or damper may by adjusted to counteract forces from the road and/or resulting from vehicle cornering, acceleration, braking, or the like.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
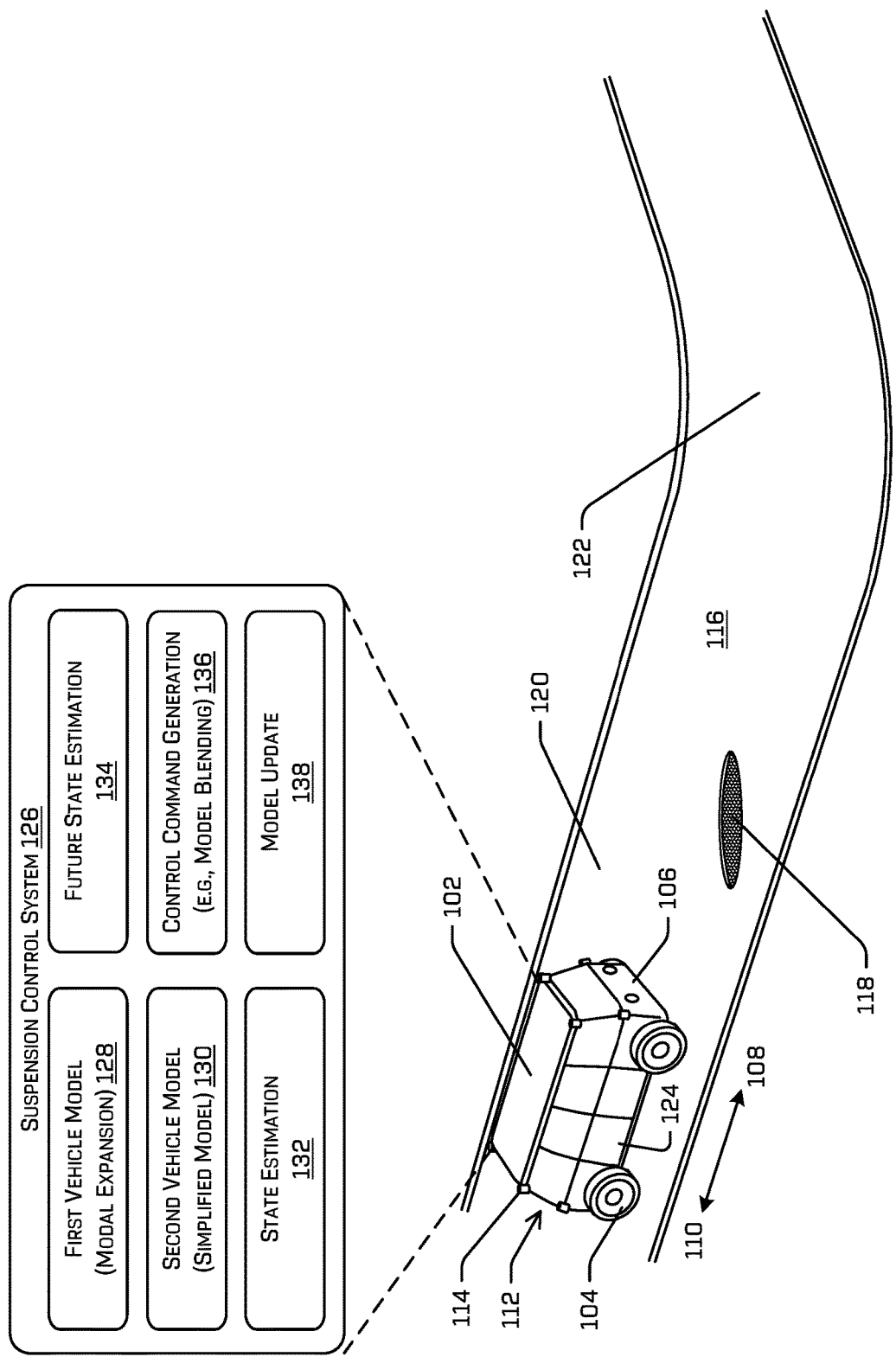
FIG. 1 includes a perspective view of an example vehicle and a schematic depiction of an example suspension control system, according to aspects of this disclosure.

This disclosure is generally directed to active suspension control methods, systems, and techniques. Aspects of this disclosure may be particularly directed to improved active suspension control techniques for improving ride comfort for passengers in a vehicle using improved vehicle models.

Conventional active and/or adaptive suspension systems generally couple wheels of a vehicle to a chassis of the vehicle. Aspects of such systems, e.g., air springs, dampers, or the like may be controlled, e.g., to facilitate movement of the wheels relative to the chassis and/or to alter other characteristics of the system, to counteract forces on the vehicle For instance, the system can be controlled to counteract roll forces encountered during cornering and/or to counteract pitch forces experienced during braking or acceleration. In some examples, a suspension system can be configured to cooperate with a pair of wheels, e.g., the two leading wheels or the two trailing wheels on the vehicle. The suspension system can include a struts and pneumatic cylinders, e.g., in fluid communication with the struts. Characteristics of the suspension system can be modified by actively modifying pressure in the pneumatic cylinders, for example.

Conventional approaches to controlling aspects of active suspension systems generally include predicting a future suspension state and, generating controls for the active suspension system based on the predicted future state. For instance, conventional methodologies for determining controls for the active suspension system can utilize a skyhook control strategy. These conventional approaches use a simplified model of the vehicle, e.g., based on a theoretical mass, stiffness, and/or damping characteristics. However, this conventional approach may have shortcomings. For example, because the model is not based on actual vehicle parameters (e.g., actual mass, stiffness, and damping). As will be appreciated, variations in parameters will exist from vehicle-to-vehicle, suspension-to-suspension, and component-to-component are inevitable, e.g., based on manufacturing tolerances or the like. Moreover, parameters will vary over the life of vehicle, e.g., due to normal wear, defects, failures, or the like. In addition, conventional approaches may be deficient they are optimized only over a short window of time, e.g., a single actuation cycle. For instance, because conventional systems look only at short windows of time, the active suspension may be overly reactive to generally transient conditions.

Aspects of this disclosure provide systems and techniques that utilize an improved vehicle model. Specifically, aspects of this disclosure relate to using a modal expansion to represent the vehicle. For instance, the modal expansion may be a linear combination of the mode shapes of the vehicle. For instance, the modal expansion can include node shape vectors associated with natural modes of the vehicle and time-dependent contribution vectors associated with the natural modes. In some examples, a vehicle can be modeled as including a plurality of natural modes. The modal expansion can include six natural modes, for example. In examples, the modal expansion of the vehicle can be determined using a running mode analysis.

Aspects of this disclosure include determining model parameters, e.g., vehicle parameters, based on the modal expansion. For instance, techniques described herein including extracting attributes of the vehicle, e.g., a mass matrix, a damping matrix, a stiffness matrix, from the modal expansion using sensor data generated at the vehicle. For instance, chassis position sensors and/or inertial measurement units may be used to determine time-based vehicle states. Such states may be determined on demand, or in some instances in real time or near-real time, and model parameters can be extracted from the modal expansion. In examples, the updated model parameters can be used to update the modal expansion. The updated model parameters can also be used to improve conventional systems, e.g., because they provide actual vehicle parameters, as opposed to theoretical or unchanging parameters.

In examples, the modal expansion model of the vehicle can be used to determine a vehicle state and to predict future vehicle states. Because the modal expansion is a more detailed model than conventional vehicle models, the current vehicle state and/or future states may be more accurate. Moreover, the modal expansion facilitates a more accurate prediction over a longer period of time. As noted above, conventional, simplified models are limited to shorter prediction time frames, because of their inherent uncertainty. For instance, conventional systems can generally predict future states for only a single actuation cycle, e.g., up to about 200 milliseconds. However, the modal expansion provides a more accurate model, which may facilitate accurate and reliable predictions over many actuation cycles, e.g., 5-10 cycles or more (up to two seconds or more).

Aspects of this disclosure include generating actuator controls based on the predicted future state(s) determined using the modal expansion. For example, aspects of this disclosure include running a global optimization, e.g., over the increased time period facilitated by the modal expansion, to determine actuator controls. As will be appreciated, because of the increased time period, the controls may be smoothed out, e.g., over the larger time window. Accordingly, the actuator response may be more accurate and less overreactive, increasing rider comfort and reducing component wear.

In aspects of this disclosure, the modal expansion-based mathematical model of the vehicle may be a first vehicle model. The systems and techniques described herein can also use one or more additional vehicle models, e.g., a second vehicle model, in addition to the first vehicle model. For example, the second vehicle model may be a simplified vehicle model, such as a conventional kinematic vehicle model. The second vehicle model may be based on theoretical vehicle parameters, measured vehicle parameters, and/or the model parameters determined according to the modal expansion of the vehicle.

Aspects of this disclosure can include determining vehicle states, predicting future vehicle states, and determining active suspension responses based on the second vehicle model, e.g., in addition to determinations made based on the first vehicle model. For example, the second vehicle model, like conventional vehicle models, may be more simplistic, and thus can be more responsive. For instance, aspects of this disclosure can include running a local optimization, e.g., over a shortened time period, using the second vehicle model, to determine actuator controls. For example, aspects of this disclosure can include using a conventional skyhook algorithm, based on the second vehicle model, to generate suspension controls. As noted above, while the first, modal expansion, vehicle model may be more accurate, it may also take increased computing resources and/or time. In some driving conditions, e.g., acceleration, deceleration, cornering, and/or on some road types, e.g., rougher roads or roads with bumps, potholes, dips, or the like, the longer time frame may be too long to generate an adequate system response. Using the second vehicle model may be preferred in such cases, for example.

In implementations of this disclosure, the techniques described herein can use both the first vehicle model and the second vehicle model to generate and implement suspension system responses. Without limitation, techniques described herein can blend or otherwise combine the controls generated using the first model and the controls generated using the second model to come to a hybrid control. In some examples, the blended or hybrid control can leverage benefits of each model. In some examples, the first vehicle model (or processing associated with the first vehicle model) can be weighted according to a first weighting factor, and the second vehicle model (or processing associated with the second vehicle model) can be weighted according to a second weighting factor. In some instances, the weighting factors can be determined based on road conditions, driving inputs, detected objects or conditions in an environment of the vehicle, and/or the like.

Systems and techniques described herein can provide many benefits. For instance, the modal models used herein are more refined than conventional models and, thus, more accurately represent the vehicle. This more accurate representation facilitates more accurate predictions of (present or future) vehicle motion, and over longer periods of time. Because the predictions are more accurate and consider a longer prediction window, the active suspension controls are generally smoother, increasing rider comfort. For example, when only shorter windows are considered, as in conventional systems, actuations of the suspension system may be more overreactive or jerky. Moreover, because a response of the active suspension may be smoother, the techniques described herein may reduce energy consumption required to (unnecessarily) actuate components and/or reduce wear resulting from such unnecessary actuation. Accordingly, power requirements of the system and wear on suspension component may be greatly reduced relative to conventional active suspension systems. The systems and techniques described herein can also be readily integrated into existing vehicles, e.g., manned vehicles, and/or autonomous vehicles. Other features and benefits are also apparent from the following description.

The techniques and systems described herein may be implemented in a number of ways. Example implementations are provided below with reference to the figures.

FIG. 1 shows an example environment 100 through which an example vehicle 102 is traveling. The example vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, the vehicle may not include a driver and/or controls for driving the vehicle 102, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times to those that are partially- or fully-autonomous.

The example vehicle 102 may be any configuration of vehicle, such as, for example, a van, a sport utility vehicle, a cross-over vehicle, a truck, a bus, an agricultural vehicle, or a construction vehicle. The vehicle 102 may be powered by one or more internal combustion engines, one or more electric motors, hydrogen power, any combination thereof, and/or any other suitable power sources. Although the example vehicle 102 has four wheels 104, the systems and methods described herein may be incorporated into vehicles having fewer or a greater number of wheels, tires, and/or tracks. In some examples, the vehicle 102 may be a bi-directional vehicle. For example, the vehicle 102 may have four-wheel steering and may operate generally with equal performance characteristics in all directions, for example, such that a first end 106 of the vehicle 102 is the front end of the vehicle 102 when travelling forward in a first direction 108, and such that the first end 106 becomes the rear end of the vehicle 102 when traveling forward in the opposite, second direction 110, as shown in FIG. 1. Similarly, a second end 112 of the vehicle 102 is the front end of the vehicle 102 when travelling forward in the second direction 110, and such that the second end 112 becomes the rear end of the vehicle 102 when traveling forward in the opposite, first direction 108. These example characteristics may facilitate greater maneuverability, for example, in small spaces or crowded environments, such as parking lots and urban areas.

The vehicle 102 may travel through the environment 100, relying at least in part on sensor data indicative of objects in the environment 100 in order to determine trajectories of the vehicle 102. For example, as the vehicle 102 travels through the environment 100, one or more sensor systems 114 capture data associated with the vehicle 102. For example, and without limitation, the sensor system(s) 114 can include chassis position sensors, inertial measurement units, accelerometers, gyroscopes, speed sensors, angle sensors, and/or any other sensors used to generate sensor data associated with a state of the vehicle 102, e.g., position, heading, movement, and/or the like.

The sensor system(s) 114 can also include sensors configured to generate information about an environment of the vehicle 102. Without limitation, the sensor system(s) 114 can generated information used to detect objects in or attributes of the environment, such as vehicles, pedestrians, buildings, barriers, unevenness in the surface on which the vehicle 102 travels, or the like. In some examples, the sensor systems 114 may include, for example, RGB-cameras, monochrome cameras, intensity (grey scale) cameras, infrared cameras, ultraviolet cameras, depth cameras, stereo cameras, and the like. The sensor systems 114 can also include, for example, one or more of light detection and ranging (LiDAR) sensors, radio detection and ranging (RADAR) sensors, one or more ultrasonic transducers, such as a sound navigation and ranging (SONAR) sensor, or other known sensor types. The data captured may be used, for example, as input to a perception and/or planning system (as described further herein) for identifying attributes of the environment, determining trajectories for the vehicle 102, and/or for other purposes.

As schematically depicted in FIG. 1, the vehicle 102 may travel on a surface 116, such as, for example, any road surface. As shown in FIG. 1, the surface 116 may include a roughness, e.g., a relatively smooth asphalt or concrete surface, a relatively rougher gravel surface, or the like. The surface 116 can also include varied features causing unevenness, e.g., depressions 118 (like a pothole, a crack, or a dip in the surface 116), protrusions (as in a speed bump or the like). Other areas of unevenness may include bumps or protrusions (e.g., a speed bump or heave in the surface 116). As also illustrated, the surface 116 can include various road segments having different shapes. For example, the illustrated road surface includes a relatively straight section 120 and a bend or curve 122. As the vehicle 102 travels along the road surface, various forces may be exerted on the wheels 104, which forces are transmitted through the wheel(s) 104 to a vehicle chassis 124 of the vehicle 102 via a suspension control system 126 coupling the wheels 104 to the vehicle chassis 124. For instance, surface unevenness, such as from the depression 118 may cause a heave condition (e.g., vertical displacement) on the wheels 104, whereas turning the vehicle 102, e.g., to navigate the curve 122, can result in roll forces (e.g., rotational displacement about a longitudinal axis of the vehicle, which may be generally parallel to the directions 108, 110).

Figure 2:
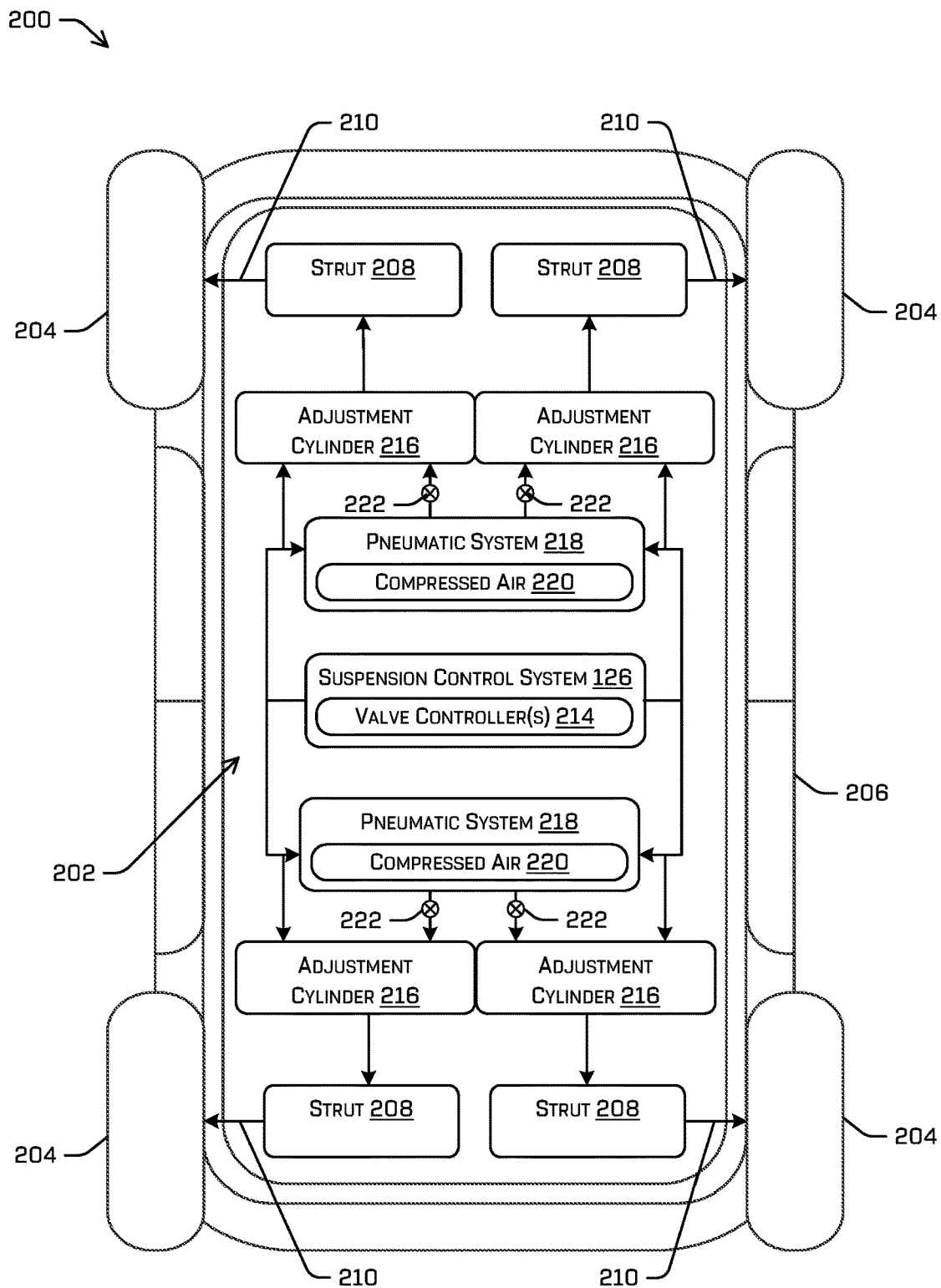
FIG. 2 is a schematic top view of an example vehicle including an example suspension system, according to implementations described herein.

As shown in FIG. 1, the vehicle 102 includes a suspension control system 126 configured to control components of the suspension system, e.g., springs, struts, shocks, bushings, or the like (which may be active or inactive). (An example suspension system with which the suspension control system 126 may be used is illustrated in FIG. 2 and detailed further below, however, aspects of this disclosure may be used with any active and/or adaptive suspension system). For example, the suspension control system 126 generally includes functionality to adjust aspects of the suspension system of the vehicle 102 to better counteract forces on the vehicle (and thus experienced by passengers in the vehicle 102) resulting from external (e.g., road conditions) and/or vehicle-induced (e.g., turning, braking, accelerating) forces. In the illustrated example, the suspension control system 126 includes a first vehicle model 128, a second vehicle model 130, a state estimation component 132, a future state estimation component 134, a control command generation component 136, and a model update/diagnostic component 138.

The first vehicle model 128 is a mathematical model of the vehicle 102. In aspects of this disclosure, the first vehicle model 128 is a modal model, e.g., a modal expansion including a plurality of modal parameters. According to the modal expansion theorem, any vibrating system can be represented as the superposition of each contributing mode of the system. Stated differently, vibratory motion can be described in terms of its mode shapes and its time-dependent and amplitude contribution factor. In the case of the vehicle 102, any kinematically allowable position can be described by a linear combination of the mode shapes of the system, e.g., according to Equation (1):

$$\{x(t)\}=\{u\}^1 q_1(t)+\{u\}^2 q_2(t)+ \ldots \{u\}^n q_n(t) \qquad (1)$$

In Equation (1), $\{u\}n$ is the mode shape or mode shape vector and $q_n(t)$ is the time-dependent contributing vector or modal coordinates. Stated differently, Equation (1) represents a total response of a system, e.g., the vehicle 102, as a linear summation of the individual contributions of the natural modes of the system. For a system with n degrees of freedom, there will be n natural modes. For example, the vehicle 102 may be modeled as a rigid body having six degrees of freedom, and, thus, six natural modes. For instance, each of the six natural modes may correspond to a different (natural) frequency, with the frequencies being between about 1.0 Hz and about 5 Hz. In some conventional modal analyses, the mode shapes and the mode factors may be calculated from a free-free condition and/or a stable reference input force such as a shaker or excitation hammer in a test lab. In other examples, a running mode analysis is used to determine the mode shapes and the mode factors. In the running mode analysis the modal parameters, e.g., the mode shapes and the mode factors, are extracted, via mathematical manipulation, from the pure motion response, e.g., while operating the vehicle on a test track or during normal driving, without knowing the excitation force. The running mode analysis may be advantageous in that it represents the real loading conditions on the vehicle, as opposed to laboratory testing conditions. As all real-world systems are to some extent non-linear, the models obtained under real loading are linearized for much more representative working points. Additionally, the model will properly take into account other influences on the system behavior, such as air spring gas pressure variations, variations in damper stiffness, bearing size variations, and/or other attributes of pre-stress suspension components.

In some examples, a peak-picking technique may be used to extract the modal parameters during the operational analysis. For example, the peak-picking technique may be applied to the auto-powers and cross-powers of the operational responses. Resonance frequencies and operational deflection shapes can be obtained and compared/decomposed into the theoretical modal analysis results. Pre-knowledge of the modal response may be required in this process. The mathematical calculation of the running mode analysis may alternatively be achieved using different methods. Without limitation, the first vehicle model 128 can be determined using a natural excitation technique, a polyreference least squares complex exponential (LSCE) method, a stochastic subspace identification algorithm (e.g., balanced reference, canonical variate analysis), and/or other techniques.

As detailed further herein, once the modal parameters are extracted from the running mode analysis, the mass, stiffness, and damping matrices, which are used to calculate future states for the vehicle 102, can be determined using Equation (2). Equation (2) describes general motion of a vibrating system:

$$F(t) = M\ddot{X} + C\dot{X} + KX \qquad (2)$$

In Equation (2), F(t) represents the external vector of excitations, M is the mass matrix, C is the damping matrix, and K is the stiffness matrix. Moreover, $\ddot{X}$, $\dot{X}$, and X are the acceleration, velocity, and displacement vectors, in generalized coordinates. More specifically, X is x(t) from Equation (1), $\dot{X}$ is the derivative of x(t), and $\ddot{X}$ is the derivative of $\dot{X}$.

The second vehicle model 130, like the first vehicle model 128, is a mathematical model of the vehicle 102. For example, the second vehicle model 130 may be based on Equation (2), but, relative to the first vehicle model 128, the second vehicle model 130 is a simplified vehicle model. For example, the second vehicle model 130 may be a kinematic model of the vehicle 102 that includes the mass of the vehicle, a spring constant, a damping coefficient, information about the wheelbase and/or track width of the vehicle 102, and/or the like. The second vehicle model 130 may include a quarter vehicle or half-vehicle model for the vehicle 102. In examples, the second vehicle model 130 may be based on theoretical values, e.g., a nominal spring coefficient, a nominal vehicle mass, and/or the like. In other examples, values associated with the mass, damping, and/or stiffness can be determined through measurement. In still further examples, the second vehicle model may use the mass, damping, and stiffness data generated via the modal analysis, discussed above in connection with the first vehicle model 128.

The state estimation component 132 includes functionality to determine a current state of a vehicle. For example, the state estimation component 132 can receive data from the sensing system(s) 114 and/or other data sources to determine a current state, e.g., position, heading, roll, pitch, heave, of the vehicle 102. Without limitation, the sensing system 114 can include chassis position sensors and inertial measurement units configured to determine a current roll, roll rate, pitch, pitch rate, heave, heave rate, speed, velocity, acceleration, and/or other attributes of the vehicle 102. In examples, the state estimation component 132 can be configured to determine the state of the vehicle at a predetermined frequency, e.g., at 1 Hz, 5 Hz, 10 Hz, 50 Hz or the like. The state estimation component 132 can be configured to determine two states of the vehicle, e.g., a first state of the vehicle based on the first vehicle model 128 and a second state of the vehicle based on the second vehicle model 130.

The future state estimation component 134 includes functionality to determine a future state of the vehicle. For example, the future state estimation component 134 includes one or more predictive algorithms that generate a predicted future states of the vehicle, e.g., over some timeframe. In examples, the future state estimation component 134 can determine a predicted roll and/or roll rate, a predicted pitch and/or pitch rate, a predicted heave and/or heave rate, and/or the like. In at least some examples, the future state estimation component 134 may be configured to determine a single predicted future state for the vehicle 102. In still further examples, however, the future state estimation component 134 may be configured to determine a plurality of future states. For example, and without limitation, the future state estimation component 134 can be configured to determine a first predicted future state of the vehicle 102 based on the first vehicle model 128 and a second predicted future state of the vehicle 102 based on the second vehicle model 130. In examples, because of the increased complexity of the first vehicle model 128 relative to the second vehicle model 130, the predicted future state based on the first vehicle model 128 may be more computationally expensive and/or take longer to determine. In contrast, the predicted future state based on the second vehicle model 130 may be computationally less expensive and/or take less time to generate.

In examples, the predicted future state based on the first vehicle model 128 may be based on a longer time period, e.g., multiple computing cycles, because of the increased complexity of the first vehicle model 128. In contrast, a predicted future state based on the simplified model, e.g., the second vehicle model 130, may be based on a shorter time period e.g., a single computing cycle. While the former may better represent the motion of the vehicle 102, because of the increased computational resources and/or time to generate, the latter may be preferred for some vehicle processing and/or in certain driving conditions. Without limitation, a current or predicted future state generated based on the first vehicle model 128 may be preferred when the vehicle does or is expected to experience periodic excitation (e.g., due to oscillations in the suspension system, periodic imperfections in the road, etc.). The current or predicted future state generated based on the second vehicle model 130 may be preferred when the current or expected excitation experienced by the vehicle is relatively transient or steady state, e.g., due to a road hazard, high acceleration or deceleration, sharp steering, or the like. As disclosed herein, contributions from the first vehicle model 128 and the second vehicle model 130 are not mutually exclusive and may be applied proportionally based on characterization of current or future excitations (e.g., between periodic or steady state/impulse excitations).

In examples, the future state estimation component 134 can receive information about the vehicle and/or about conditions associated with the vehicle to generate the future state(s). For example, and without limitation, the future state estimation component 134 can receive information about current characteristics of the vehicle, e.g., the current state(s) determined by the state estimation component 132. The future state estimation component 134 can also receive information about vehicle commands, e.g., commands associated with steering, acceleration (like torque commands and/or braking commands), speed, and/or the like. The future state estimation component 134 can also receive information about the road surface, e.g., as map data, perception data, and/or the like, about objects in an environment of the vehicle (e.g., information about objects that may affect control and/or travel of the vehicle, including but not limited to the depression 118, other vehicles, pedestrians), and/or the like. In still further examples, the future state estimation component 134 can receive information from a planning component (such as the planning component 524 discussed below) to determine predicted future state(s) of the vehicle 102. Information from the planning component can include, but is not limited to, trajectory information, routing information, and/or the like. As will be appreciated, the future state estimation component 134 determines the predicted future state(s) by projecting the current state into the future based at least in part on the vehicle model(s) 128, 130, the received data, and/or other factors.

The control command generation component 136 includes functionality to determine suspension controls to adjust the suspension system of the vehicle 102 based on the future state(s) determined by the future state estimation component 134. For example, the control command generation component 136 can implement one or more control algorithms that determine command controls for configuring aspects of the suspension control system 126 to offset expected external forces associated with the predicted future state(s). In examples, the control command generation component 136 can implement a non-linear control algorithm, e.g., a skyhook algorithm, to determine a controller response based on the predicted future state.

In examples, the control command generation component 136 can include functionality to determine control commands based on the first vehicle model 128, the second vehicle model 130, or a combination of both the first vehicle model 128 and the second vehicle model 130. For instance, and as noted above, the first vehicle model 128 may better represent the motion of the vehicle 102, and thus lead to more accurate future state determinations. As a result, using the modal approach described above, as embodied in the first vehicle model 128, may result in commands that better respond to the motion, e.g., with increased user comfort, vehicle wear, and/or the like. Stated differently, better motion prediction and over a longer time period will result in smoother suspension system actuation over that longer time period. In contrast, conventional models, which may include the second vehicle model 130, may not represent motion as well and/or may be limited to a shorter time period, e.g., because they are more simplistic, may be based on theoretical and/or normalized values, and/or due to other factors. In at least some examples, the control command generation command component can perform a global optimization using the first vehicle model 128 for a relatively longer period of time, e.g., from about 1 to about 2 seconds, and a local optimization using the second vehicle model 130 for a relatively shorter period of time, e.g., up to about 200 ms. In examples, the local optimization may correspond to one computing cycle at 5 Hz, whereas the global optimization may correspond to on the order of from about 5 to about 10 computing cycles, e.g., 0.5 Hz to 1 Hz.

While the control commands determined based on the first model may be preferred in aspects of this disclosure, because of the increased computing resources and processing time associated with the more complex model, these control commands may not be timely. For instance, when the vehicle 102 encounters rapidly-changing driving conditions, e.g., as a result of varied road conditions like the depression 118, as a result of varied driving, e.g., rapid acceleration, braking, and/or steering, the projected states determined in accordance with the first vehicle model 128 may be less reliable, e.g., because of the extended computing time and the reality that conditions on the vehicle will change relatively quickly. Thus, the second vehicle model 130, although less precise, may be preferred in some instances.

Accordingly, aspects of this disclosure include implementations in which the control command generation component 136 performs a weighting or blending operation that includes both the first vehicle model 128 and the second vehicle model 130 to determine control commands for controlling aspects of the suspension system of the vehicle 102. For instance, the control command generation component 136 can generate a first weighting factor for the first vehicle model 128 and a second weighting factor for the second vehicle model 130, and generate commands based at least in part on these weighting factors. As noted above, the first vehicle model 128 may be more heavily weighted in instances in which driving conditions are less likely to change dramatically, e.g., a relatively straight road with limited traffic, whereas the second vehicle model 130 may be more heavily weighted when driving conditions are more likely to change, e.g., winding roads with increased surface irregularities and/or more traffic.

In implementations, the weighting factors determined by the control command generation component 136 can include, but are not limited to a road characterization, a driving input characterization, an identification of a special event, or the like. For example, the road characterization can include whether the driving surface 116 is a rough road, a wavy road, a smooth road, a highway, a gravel road, a dirt road, or the like. The driving input characterization may relate to a characterization of one or more steering inputs, such as steering commands, torque commands, braking commands, vehicle speed, and/or the like. Special events can generally relate to conditions, e.g., surface anomalies, that could require a quicker or more evasive response, such as potholes, speed bumps, or the like. These weighting factors are for example only, any factors that can impact the gains and balance between addressing road- and driving-induced motions may be considered when determining the weighting factors.

In at least some examples, the control command generation component 136 will include two modules to determine command controls for aspects of the suspension system, e.g., an air spring, a damper, or the like. The first module may determine control commands based on the first vehicle model 128 and the second module may determine control commands based on the second vehicle model 130. Outputs of the two modules may be blended (and subsequently implemented) based on the weighting factors discussed above. In one non-limiting example, the weighting factors may be percentages associated with each of the modules/module outputs. For example, the output of the first module may be more heavily weighted, e.g., from about 0.8 to about 0.9 or more when the vehicle is travelling on a highway, e.g., because the highway is relatively smooth with few special events. However, because the highway may have a pothole or other disruptive surface feature, identification of an object may require a quick deceleration or other evasive maneuver, the output of the second module may have a non-zero weighting, e.g., up to about 0.2 or more. Of course, this is only an example to demonstrate that responses determined according to both the first vehicle model 128 and the second vehicle model 130 may be leveraged to improve active suspension control.

The model update component 138 includes functionality to determine, based on the first vehicle model 128, updated model parameters. For instance, the model update component 138 can perform a running mode analysis, as discussed above, to determine the model parameters of the vehicle, such as actual mass, damping, and/or stiffness values. As discussed above, the running mode analysis can determine a modal expansion of the system from which the mass, damping, and stiffness matrices can be generated, based on measurement of the vehicle 102, such as measurements from chassis position sensors and/or IMUs. In some instances the model update component 138 can determine the model parameters in real-time or near-real-time, e.g., based on data from vehicle sensors, as detailed herein. However, in some examples, the model parameters may alternatively be updated periodically, e.g., daily, weekly, monthly or the like, inasmuch as computing the model parameters may be computationally expensive and/or, while it is expected that components impacting the model parameters will vary, e.g., because of wear, use, or the like, the rate at which these variances occur is not expected to be of such a frequency that real-time updating is required.

The model update component 138 can also be used to perform diagnostics on the vehicle 102. For example, as detailed herein, model parameters of the vehicle 102, such as the mass, stiffness, and damping matrices, can be determined from the first vehicle model 128. Moreover, aspects of this disclosure describe updating the model, based on measured data. The model update component 138 can also extract updated model parameters, e.g., actual, real-time values of the model parameters, from the updated model. The model parameters will vary from vehicle-to-vehicle, e.g., due to manufacturing tolerances, component variations, as well as on the same vehicle over time, e.g., based on wear. Although variation is expected, aspects of this disclosure can also determine whether extracted model parameters are outside of an expected tolerance.

In some examples, the model update component 138 can compare values of extracted model parameters to operational thresholds associated with the vehicle 102. For example, an operational threshold may be a range of values for one or more of the vehicle parameters. In examples in which the updated model parameters are within the operational threshold, the changed parameters may be acceptable, and the first vehicle model 128 may be updated with the updated model parameters. Alternatively, if the difference is outside of the operational threshold, the model update component 138 can identify an anomalous condition. For example, the anomalous condition may be associated with a defective (e.g., broken or overly worn) spring, strut, bushing, sway bar, or other component. In other examples, instead of comparing extracted model parameter values to an operational threshold, the updated model parameters may be compared to previously-determined model parameters. For instance, when the updated model parameters are within a threshold difference of previously-determined model parameters, the model update component 138 can determine the update to be acceptable, e.g., due to normal vehicle wear and/or fluctuations. For instance, and without limitation, a parameter change of less than about 10% or less than about 5% may be acceptable. Alternatively, if a difference between the model parameters is greater than some threshold difference, e.g., greater than 10% or 5% in the example above, techniques described herein can identify the anomalous condition. When an anomalous condition is identified, the vehicle 102 may be further diagnosed by a technician, for example, with defective parts being repaired or replaced.

As will be appreciated from the foregoing, aspects of this disclosure relate to modeling a vehicle using a modal expansion and using the model to determine current vehicle states, generate predicted, future states of the vehicle, and/or control aspects of a suspension system of the vehicle responsive to the future states. The techniques described herein also include using both the modal expansion model, e.g., as the first vehicle model 128, and a simplified model, e.g., as the second vehicle model 130, to determine command controls for controlling aspects of the suspension system. Moreover, the modal expansion may also facilitate on-demand determination of model parameters and, in some instances, ready identification of vehicle anomalies.

The techniques described herein may be particularly directed to controlling active suspension systems in vehicles, such as the vehicle 102. FIG. 2 is a schematic top view of an example vehicle 200, which may correspond to the example vehicle 102 shown in FIG. 1. The example vehicle 200 includes an example suspension system 202 having a plurality of components controllable by the suspension control system 126, e.g., in accordance with the techniques described herein. In more detail, the example vehicle 200 includes four wheels 204 located generally at four respective corners of a vehicle chassis 206. Each of the wheels 204 may be coupled to the vehicle chassis 206 via a respective strut 208. For example, each of the struts 208 may be coupled to a respective wheel 204 via a suspension control arm 210, depicted schematically in FIG. 2. In some examples, one or more (e.g., each) of the struts 208 may include a pneumatic spring coupled to one of the control arms 210, and the pneumatic springs may be charged, e.g., by a pneumatic system 212, to establish a ride height of the vehicle 200 at the respective wheels 204 by moving pistons of the struts 208, for example. In some examples, the suspension system 202 may be configured to permit two or four of the wheels 204 to pivot to create steering angles for maneuvering the vehicle 200.

As shown in FIG. 2, the example vehicle 200 also includes the suspension control system 126 which may include, in some examples, valve controller(s) 214 configured to control the stiffness of the suspension system 202 of the vehicle 200, for example, by controlling air flow into/out of adjustment cylinders 216. The example vehicle 200 may also include one or more pneumatic systems 218 including a source of compressed air 220 (e.g., a pump, compressor, and/or a tank of compressed air), which may be used to pressurize or charge the adjustment cylinders 216 and/or the struts 208 of the vehicle 200.

As shown in FIG. 2, the suspension system 202 may also include input valves 222 to control flow communication between the source(s) of compressed air 220 of the pneumatic system(s) 218 and the adjustment cylinders 216 and the struts 208. The valves 222 may be configured to open to provide flow communication to the respective struts 208, to close to prevent flow communication to the respective struts 208, and in some examples, to release pressure from the respective struts 208. Some examples of the suspension control system 126 may include one or more additional valves independent from the valves 222 to release pressure from respective pneumatic springs. Also in examples, the vehicle 200 can include one or more sensors, which may be configured to generate respective signals indicative of the pressure in the respective pneumatic springs, struts 208 and/or the adjustment cylinders 216.

The valve controller(s) 214 may be configured to adjust a stiffness of the suspension system 202. In some examples, the valve controller(s) 214 may be configured to receive one or more signals generated by one or more components of the vehicle, e.g., based on commands generated by the control command generation component 136, discussed above. Based at least in part on those signals, the valve controller(s) 214 may be configured to cause the suspension system 202 to operate one or more of the valves 222 to adjust the pressure differential in the adjustment cylinders 216 and/or to adjust pressure in the air springs associated with the struts 208, to change the suspension stiffness. For example, the valve controller(s) 214 may be configured to stiffen the suspension, to loosen the suspension, to change a ride height for one or more of the wheels 204, and/or effect other changes to the suspension 202.

Although in the example just described the commands generated by the control command generation component 136 are used to control the valve controller(s) 214, other aspects of the suspension system 202 may be controlled. In other examples, a pneumatic spring can be adjusted. In other examples, the suspension system 202 can allow for adjustment of dampers, mechanical linkages, and/or any other components that facilitate suspension adjustment.

Figure 3:
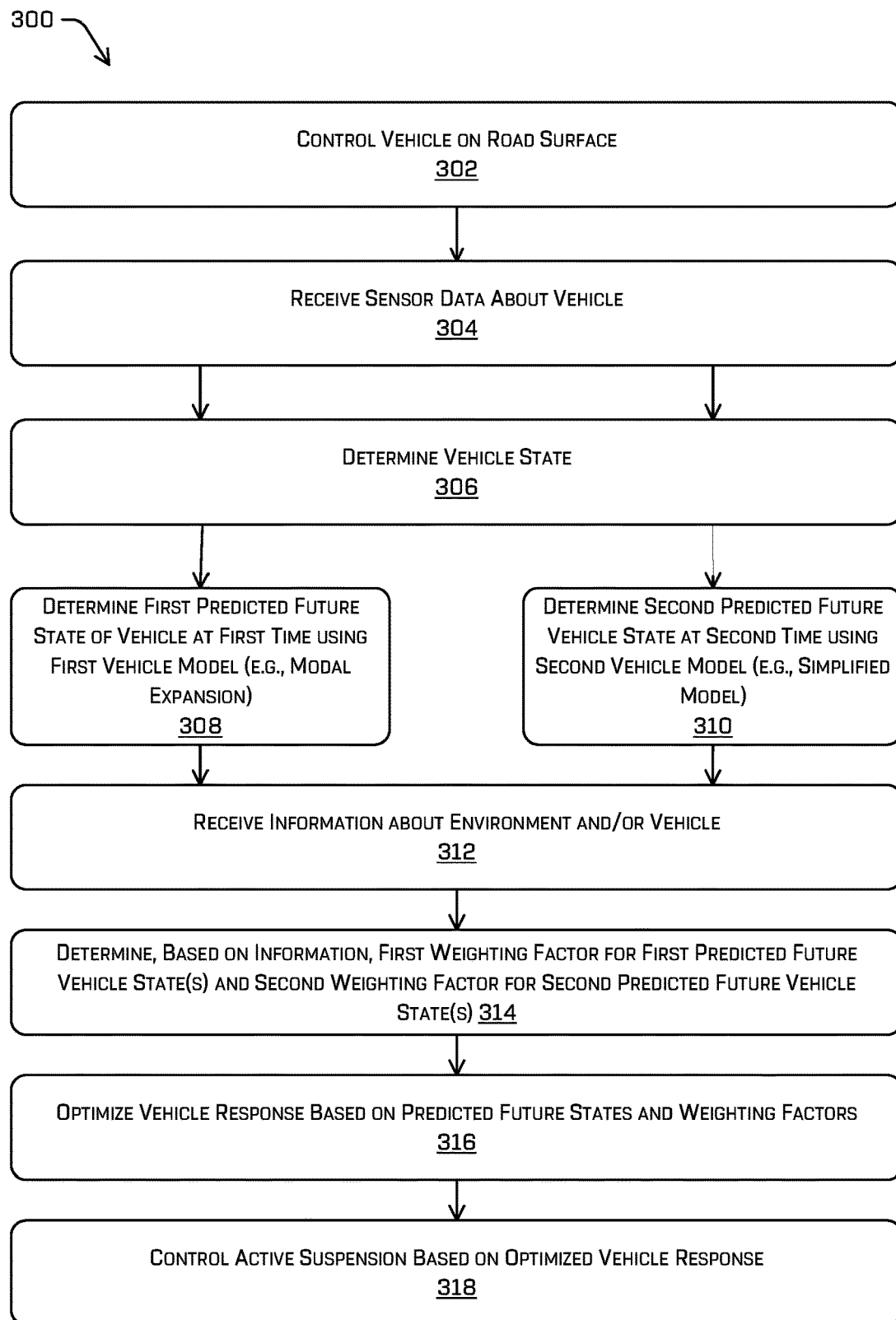
FIG. 3 is a flow diagram of an example process for controlling a vehicle suspension, according to examples described herein.
Figure 4:
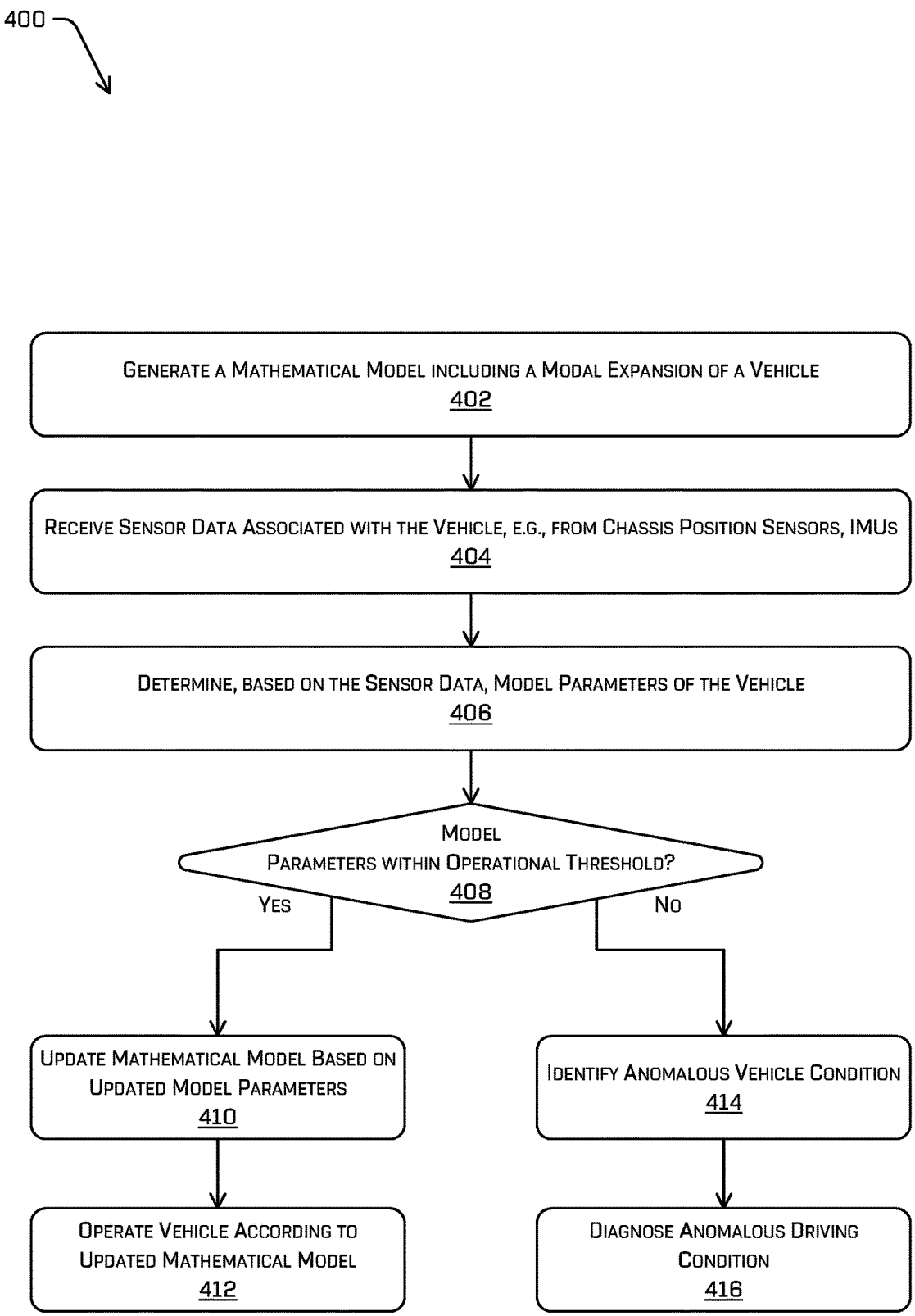
FIG. 4 is a flow diagram of an example process for updating a mathematical model representation of a vehicle and diagnosing vehicle anomalies, according to examples described herein.

FIGS. 3 and 4 illustrate example processes in accordance with embodiments of the disclosure. These processes are illustrated as logical flow graphs, with each operation representing a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 is a flowchart illustrating an example process 300 for controlling a suspension system of a vehicle. In examples described herein, the techniques associated with the process 300 may be performed by components of the vehicle 102 and/or the vehicle 200, including but not limited to the suspension control system 126. However, the process 300 is not limited to being performed by the suspension control system 126, and the suspension control system 126 may perform processes in addition to or different from the process 300.

At an operation 302, the process 300 includes controlling a vehicle on a road surface. Examples of this disclosure may be suited for use with any vehicle including an active or otherwise controllable suspension system. For instance, the operation 302 can include autonomous control of a vehicle, e.g., without any driver or human input, or manual control of a vehicle.

At an operation 304, the process 300 includes receiving sensor data about the vehicle. Without limitation, the vehicle may be equipped with one or more sensors, like the sensor systems 114 discussed above. The sensors can include, without limitation, one or more of position sensors, e.g., chassis position sensors, inertial measurement units, accelerometers, gyroscopes, speed sensors, pressure sensors, and/or the like. The sensors generate data about the vehicle, e.g., in real-time, while the vehicle is being operated.

At an operation 306, the process 300 includes determining a vehicle state. In examples of this disclosure, the vehicle state may be a current vehicle state that includes one or more of a position of the vehicle, an orientation of the vehicle, movement of the vehicle, and/or the like. Without limitation, the state of the vehicle can include a current vehicle velocity, a current yaw rate, or the like.

An operation 308, the process 300 includes determining one or more first predicted future states of the vehicle over a first time period using a first vehicle model. In examples of this disclosure, the first vehicle model is a modal expansion of the vehicle. As detailed herein, because the mathematical model of the vehicle that includes the modal expansion is more accurate than conventional, simplified models, the first vehicle model can offer improvements in determining both the current vehicle state as well as predicted future states of the vehicle. For instance, a propagation model based on the first vehicle model can provide improved accuracy over longer periods of time, e.g. up to and including multiple actuator cycles of the vehicle. Stated differently, the more robust first vehicle model may provide improved visibility to future states of the vehicle.

At an operation 310, the process 300 optionally includes determining one or more second predicted future states of the vehicle, over a second time period using a second vehicle model. As detailed herein, the second vehicle model may be a simplified vehicle model may that be useful only for generating predictive vehicle states for a relatively short time period, e.g., a single actuator or computing cycle of the vehicle. Because the operation 310 may predict future states over a shorter time period, the future state(s) may be generated more quickly and/or with reduced computing resources.

At an operation 312, the process 300 includes receiving information about an environment of the vehicle and/or information about the vehicle. In at least some examples, the operation 312 can include receiving a road characterization of the road surface on which the vehicle is traveling. In still further examples, the operation 312 can include receiving information about objects in the environment of the vehicle. Such objects may include, but are not limited to, obstacles or inconsistencies in the road surface, such as potholes, speed bumps, small objects, or the like, additional vehicles, pedestrians, and/or any other objects that may impact travel of the vehicle on the road surface. Also in examples, the operation 312 can include receiving information about driving commands associated with controlling the vehicle on the road surface. For instance, such driving commands can include steering commands, e.g., as steering angles, acceleration commands, braking commands, torsion commands, speed commands, and/or other commands associated with operation of the vehicle.

At an operation 314, the process 300 includes determining, based on the information, a first weighting factor for the first predicted future vehicle state and the second weighting factor for the second predicted future vehicle state. As detailed herein, the first weighting factor and the second weighting factor can be determined, based on the information received at the operation 312, to leverage benefits of each of the models, based on conditions impacting the vehicle. For example, the shorter time period associated with the simplified model may be weighted more heavily when the vehicle is cornering, navigating an obstacle, or undertaking some other action that may have a shorter time horizon. Alternatively, the longer time period and more accurate controls associated with the modal expansion may be favored in instances in which the vehicle is likely to experience similar conditions over a longer period of time. Other examples will be appreciated from the foregoing description.

At an operation 316, the process 300 includes optimizing vehicle response based on the predicted future states and the weighting factors. For example, and as detailed herein, a global optimization may be performed using the first vehicle model, or as a local optimization may be performed using the simplified model to generate control commands for the suspension system. Combining, or blending aspects first vehicle model and the second vehicle model, and processes associated therewith, an improved response for the suspension system can be achieved.

At an operation 318, the process 300 includes controlling an active suspension based on the optimized vehicle response. For example, air springs, struts, and/or other suspension components may be adjusted based on the commands generated at the operation 316, two promote an improved vehicle response. The improved vehicle response may provide improved passenger comfort, for example.

FIG. 4 is a flowchart illustrating an example process 400 for generating and updating a mathematical vehicle model of a vehicle for controlling and/or diagnosing anomalies associated with a suspension system of the vehicle. In examples described herein, the techniques associated with the process 400 may be performed by components of the vehicle 102 and/or the vehicle 200, including but not limited to the suspension control system 126. However, the process 400 is not limited to being performed by the suspension control system 126, and the suspension control system 126 may perform processes in addition to or different from the process 400.

At an operation 402, process 400 includes generate a mathematical model including the modal expansion of the vehicle. As detailed above, in connection with FIG. 1, the modal expansion of the vehicle may be determined using a running mode analysis to determine modal parameters of the vehicle. Such modal parameters can include mode shapes and time-dependent mode factors, for example. In at least one example, the mode shapes may be determined up to a predetermined frequency. For example, mode shapes associated with frequencies up to and including a frequency of an actuation cycle of the vehicle may be determined. For instance, when a vehicle has a computing or actuation cycle of 5 Hz, the modal expansion may include all-natural modes having a natural frequency up to and including 5 Hz.

At an operation 404, the process 400 includes receiving sensor data associated with the vehicle. For example, the sensor data may be generated from one or more of chassis position sensors, inertial measurement units, or the like. In examples, the sensors can be configured to generate data as the vehicle moves through an environment, e.g., at a predetermined frequency. The operation 414 include receiving the sensor data according to that frequency, on demand, or at some other interval.

At an operation 406, the process 400 includes determining, based on the sensor data, model parameters of the vehicle. For instance, and as detailed above in connection FIG. 1, the modal expansion may be used along with equations of motion to determine one or more of a mass matrix, a damping matrix, and/or a stiffness matrix associated with the vehicle. In this example, the model parameters can be determined on demand, e.g., including in real-time.

At an operation 408, the process 400 includes determining whether the model parameters are within an operational threshold. For example, the operation 408 can include comparing the model parameters to the threshold range of acceptable values for the model parameters. Without limitation, such ranges can be determined based on attributes of components associated with the vehicle, including, a nominal spring stiffness, a nominal damping coefficient, or the like. In other examples, the ranges can be determined from modeling, heuristics, or the like.

If, at the operation 408, it is determined that the model parameters are within an operational threshold, at an operation 410, the process 400 includes updating the mathematical model based on the updated model parameters. As will be appreciated, because the model parameters are determined based on information about the vehicle, e.g., the sensor data, the updated mathematical model will more accurately represent the vehicle. In examples, the operation 408, and thus the operation 410, can be performed at predetermined intervals, e.g., including daily, weekly, monthly, or the like, to ensure that the mathematical model of the vehicle accounts for any changes to the vehicle, e.g., resulting from wear, damage, or the like.

At an operation 412, the process 400 includes operating the vehicle according to the updated mathematical model. For example, the operation 412 can include some or all of the process 300, discussed above.

Alternatively, if, at the operation 408, it is determined that the model parameters are not within an operational threshold, an operation 414 of the process 400 includes identifying an anomalous vehicle condition. For instance, if one or more of the model parameters are outside an expected range of values, the vehicle may require maintenance. For instance, the anomalous condition can result from a broken, defective, or overworn component. In this example, although the model parameters may not identify the exact component causing the anomaly, the anomaly can nonetheless be detected and fixed.

At an operation 416, the process 400 includes diagnosing the anomalous driving condition. For example, the vehicle may be taken off the road for service and diagnostic testing to determine whether and which parts may be defective and/or in need of repair/replacement.

Figure 5:
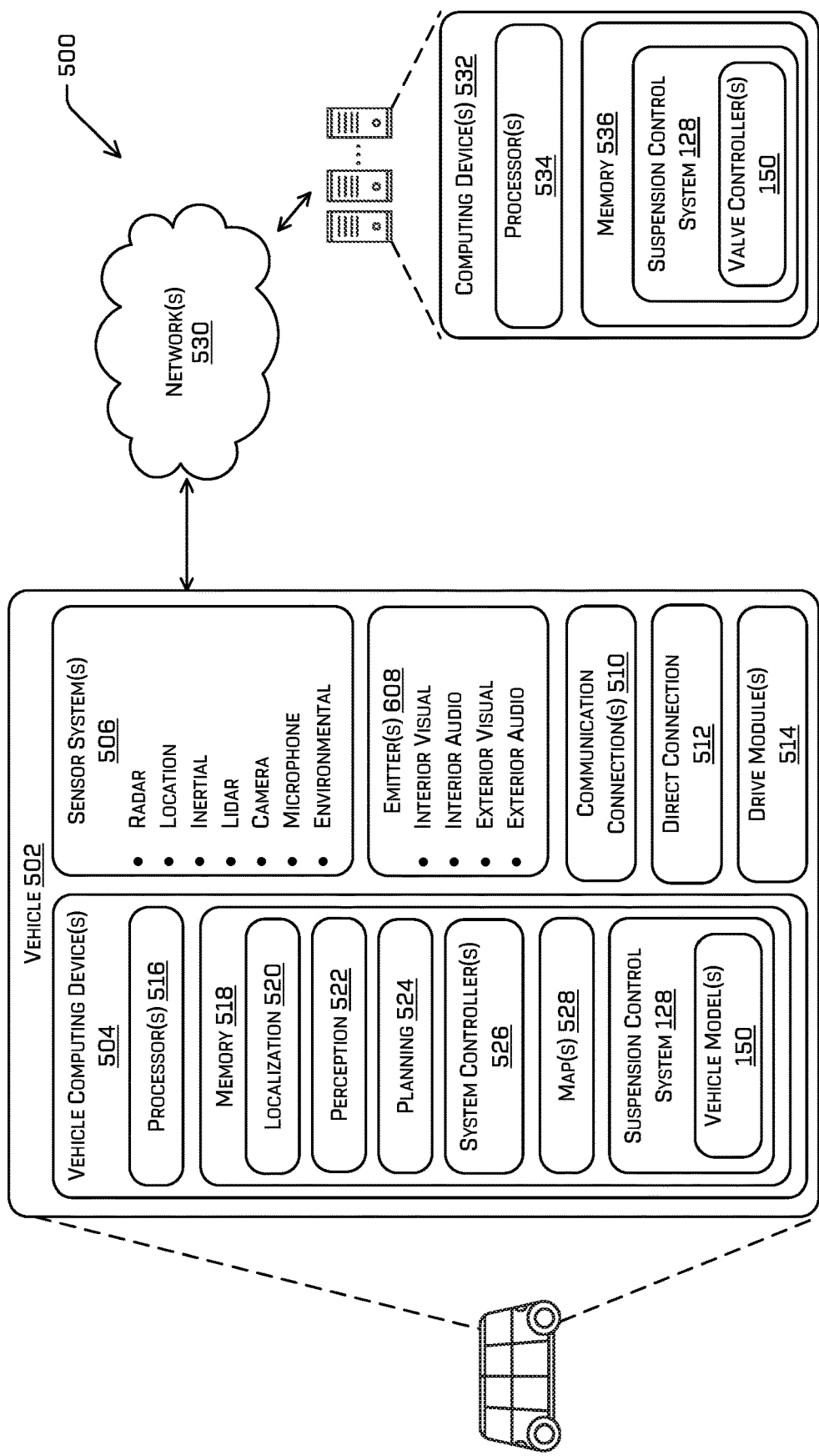
FIG. 5 is a block diagram of an example system for implementing the suspension system and related techniques described herein.

FIG. 5 depicts a block diagram of an example system 500 for implementing the techniques described herein. In at least some examples, the system 500 may include a vehicle 502, which may correspond to the example vehicle 102 shown in FIG. 1. The vehicle 502 may include a vehicle computing device 504, one or more sensor systems 506, one or more emitters 508, one or more communication connections 510, at least one direct connection 512, and one or more drive modules 514.

The vehicle computing device 504 may include one or more processors 516 and memory 518 communicatively coupled with the one or more processors 516. In the illustrated example, the vehicle 502 is an autonomous vehicle. However, the vehicle 502 may be any other type of vehicle. In the illustrated example, the memory 518 of the vehicle computing device 504 stores a localization component 520, a perception component 522, a planning component 524, one or more system controllers 526, one or more maps 528, and an example suspension control system 126, including one or more example valve controllers 150. Though depicted in FIG. 5 as residing in memory 518 for illustrative purposes, it is contemplated that the localization component 520, the perception component 522, the planning component 524, the one or more system controllers 526, the one or more maps 528, and the suspension control system 126 may additionally, or alternatively, be accessible to the vehicle 502 (e.g., stored on, or otherwise accessible by, memory remote from the vehicle 502).

In at least one example, the localization component 520 may be configured to receive data from the sensor system(s) 506 to determine a position and/or orientation of the vehicle 502 (e.g., one or more of an x-, y-, z-position, roll, pitch, or yaw). In some examples, such a position/orientation may be determined relative to a map, described below, such that a ride height for each wheel may be determined. For example, the localization component 520 may include and/or request/receive a map of an environment and may continuously determine a location and/or orientation of the autonomous vehicle within the map. In some examples, the localization component 520 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 520 may provide data to various components of the vehicle 502 to determine an initial position of an autonomous vehicle for generating a candidate trajectory, as discussed herein.

In some examples, the perception component 522 may be configured to perform object detection, segmentation, and/or classification. In some examples, the perception component 522 may provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional and/or alternative examples, the perception component 522 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc. Moreover, in aspects of this disclosure, the perception component 522 can identify road unevenness, e.g., dips, bumps, speed bumps, or the like.

In general, the planning component 524 may determine a path for the vehicle 502 to follow to traverse through an environment. For example, the planning component 524 may determine various routes and trajectories and various levels of detail. For example, the planning component 524 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 524 may generate an instruction for guiding the autonomous vehicle along at least a portion of the route from the first location to the second location. In at least one example, the planning component 524 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

The system controller(s) 526, may be configured to control steering, propulsion, braking, safety, emitters, communication, and other systems of the vehicle 502. These system controller(s) 526 may communicate with and/or control corresponding systems of the drive module(s) 514 and/or other components of the vehicle 502.

The map(s) 528 that may be used by the vehicle 502 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 528 may include at least one map (e.g., images and/or a mesh). In some example, the vehicle 502 may be controlled based at least in part on the maps 528. That is, the maps 528 may be used in connection with the localization component 520, the perception component 522, and/or the planning component 524 to determine a location of the vehicle 502, identify objects in an environment, and/or generate routes and/or trajectories to navigate within an environment. Also in examples, the map(s) 528 may be used by the suspension control system 126 to identify curves, e.g., to engage the anti-roll functionality described herein in anticipation of navigating such curves. In some instances, the map(s) 528 can identify roads or road segments having a radius equal to or above a threshold radius, which roads/segments may be identified as road surface for which the anti-roll functionality should be engaged.

In some examples, the one or more maps 528 may be stored on a remote computing device(s) (such as the computing device(s) 532) accessible via network(s) 530. In some examples, multiple maps 528 may be stored based on, for example, a characteristic (e.g., type of entity, time of day, day of week, season of the year, etc.). Storing multiple maps 528 may have similar memory requirements but may increase the speed at which data in a map may be accessed. In at least some examples, such maps may have stored information regarding surface conditions (including friction, unevenness, potholes, and the like).

As shown in FIG. 5, in some examples, the suspension control system 126 may be stored in the memory 518 of the vehicle computing device 504 of the vehicle 502 or remote from the vehicle 502 in the memory 536 of the computing device(s) 532. In some examples, some portions of the suspension control system 126 may be stored in the memory 518 of the vehicle computing device 504 of the vehicle 502, and other portions of suspension control system 126 may be stored remotely in the memory 536 of the computing device(s) 532, and the separately located portions of the suspension control system 126 may operate together in a coordinated manner.

The suspension control system 126 (and the valve controller(s) 150) are detailed above in connection with FIG. 1. Generally, the suspension control system 126 (including the valve controller(s) 150) may include functionality to selectively engage or disengage pneumatic anti-roll functionality. Moreover, the suspension control system 126 can adjust a stiffness of the anti-roll feature, e.g., as detailed in connection with FIGS. 3 and 4. In any such example, the suspension control system 126 may utilize data from any one or more of the maps (e.g., map data regarding upcoming terrain, potholes, etc.) and/or trajectories generated by the planning component 524 (e.g., speeds, rate of curvature, steering angles, and the like) to alter one or more characteristics of the suspension system as detailed herein.

In some examples, aspects of some or all of the components discussed herein may include any models, algorithms, and/or machine learning algorithms. For example, in some examples, the components in the memory 518 and/or the memory 536 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 506 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 506 may include multiple examples of each of these or other types of sensors. For example, the LIDAR sensors may include individual LIDAR sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or alternatively, the sensor system(s) 506 may send sensor data, via the one or more networks 530, to the one or more computing device(s) at a particular frequency, after a lapse of a predetermined period of time, in near real-time, etc.

The emitter(s) 508 can be configured to emit light and/or sound. The emitter(s) 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The communication connection(s) 510 can enable communication between the vehicle 502 and one or more other local or remote computing device(s). For example, the communication connection(s) 510 may facilitate communication with other local computing device(s) on the vehicle 502 and/or the drive module(s) 514. Also, the communication connection(s) 510 may allow the vehicle 502 to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 530. For example, the communications connection(s) 510 may enable Wi-Fi-based communication, such as via frequencies defined by the IEEE 802.11 standards, short range wireless frequencies such as Bluetooth®, cellular communication (e.g., 5G, 3G, 4G, 4G LTE, 5G, etc.) or any suitable wired or wireless communications protocol that enables the respective computing device to interface with the other computing device(s).

In at least one example, the direct connection 512 may provide a physical interface to couple the drive module(s) 514 with the body of the vehicle 502. For example, the direct connection 512 may allow the transfer of energy, fluids, air, data, etc. between the drive module(s) 514 and the vehicle 502. In some examples, the direct connection 512 may further releasably secure the drive module(s) 514 to the body of the vehicle 502.

The vehicle 502 may also include the drive module(s) 514. In some examples, the vehicle 502 may have a single drive module 514. In at least one example, if the vehicle 502 has multiple drive modules 514, individual drive modules 514 may be positioned on opposite ends of the vehicle 502 (e.g., the front and the rear, etc.). In at least one example, the drive module(s) 514 may include one or more sensor systems to detect conditions of the drive module(s) 514 and/or the surroundings of the vehicle 502. By way of example and not limitation, the sensor system(s) 506 may include one or more wheel encoders (e.g., rotary encoders) to sense rotation of the wheels (e.g., wheels 104 in FIG. 1) of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 514. In some cases, the sensor system(s) on the drive module(s) 514 may overlap or supplement corresponding systems of the vehicle 502 (e.g., sensor system(s) 506).

The drive module(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system, such as the suspension control system 126, including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 514 may include a drive module controller, which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 514. Furthermore, the drive module(s) 514 also include one or more communication connection(s) that enable communication by the respective drive module with one or more other local or remote computing device(s).

In at least one example, the localization component 520, perception component 522, the planning component 524, and/or the suspension control system 126 may process sensor data, as described above, and may send their respective outputs, over the one or more network(s) 530, to one or more computing device(s) 532. In at least one example, the localization component 520, the perception component 522, the planning component 524, and/or the suspension control system 126 may send their respective outputs to the one or more computing device(s) 532 at a particular frequency, after a lapse of a predetermined period of time, in near real-time, etc.

The processor(s) 516 of the vehicle 502 and/or the processor(s) 534 of the computing device(s) 532 may be any suitable processor capable of executing instructions to process data and perform operations as described herein. By way of example and not limitation, the processor(s) 516 and 534 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and 536 are examples of non-transitory computer-readable media. The memory 518 and 536 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 532, and/or components of the computing device(s) 532 may be associated with the vehicle 502. That is, the vehicle 502 may perform one or more of the functions associated with the computing device(s) 532, and vice versa.

The systems, components, and methods described herein are for example only; modifications and alterations are contemplated. By way of non-limiting example, although the configuration illustrated in FIG. 1 includes the first and second adjustment cylinders 142, 144, other components can be used to impart similar functionality. By way of non-limiting example, one or more of the first volumes 154, 160 and the second volumes 156, 162 can be embodied as any compressible and expandable) structure defining a volume, including but not limited to air bladders, bellows, or the like. In examples in which bladders or baffles are used, for example, the pistons 152, 158 and/or the piston rod 188 can be replaced with a movable structure, such as a plate disposed between the bladders/baffles. Any arrangement that allows for regulation of pressure between connected volumes and relative movement of rigid structures acted on by the volumes can be used.

References herein to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular implementations, "connected" may be used to indicate that two or more elements are in direct physical or fluid contact with each other. "Coupled" may mean that two or more elements are in direct physical or fluid contact. However, "coupled" may also mean that two or more elements are not in direct contact with each other, but yet still co-operate or interact with each other.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and components are disclosed as exemplary forms of implementing the claims.

Example Clauses

A: An example vehicle includes: an active suspension system; sensors; one or more processors; and non-transitory computer readable media storing one or more instructions implemented by the one or more processors to perform actions comprising: receiving a first mathematical model of the vehicle, the first mathematical model being based at least in part on a modal expansion of the vehicle; receiving a second mathematical model of the vehicle, the second mathematical model being based at least in part on a kinematic model of the vehicle; receiving, from a sensor on the vehicle, sensor data about the vehicle; determining, based at least in part on the sensor data, an estimation of a current state of the vehicle; determining, based at least in part on the estimation and the first mathematical model, a first predicted future state of the vehicle; determining, based at least in part on the estimation and the second mathematical model, a second predicted future state of the vehicle; determining a command for controlling the active suspension system based on the first predicted future state and the second predicted future state; and controlling the active suspension system based at least in part on the command.

B: The vehicle of example A, wherein: the determining the command for controlling the active suspension system comprises determining a global optimization based on the first predicted future state over a first time period and determining a local optimization based on the second predicted future state over a second time period shorter than the first time period.

C: The vehicle of example A or example B, wherein the second time period corresponds to an actuation cycle of the vehicle and the first time period is equal to five or more actuation cycles.

D: The vehicle of any one of example A through example C, the actions further comprising: determining a first weighting factor for the first predicted future state and a second weighting factor for the second predicted future state; and determining the command based at least in part on the first weighting factor and the second weighting factor.

E: The vehicle of any one of example A through example D, wherein the first weighting factor corresponds to a periodic excitation of the active suspension system and the second weighting factor corresponds to an impulse or steady state excitation of the active suspension system.

F: The vehicle of any one of example A through example E, wherein the first predicted future state or the second predicted future state is determined based at least in part on an expected excitation of the active suspension system as a result of a future state of the vehicle resulting from use of an autonomous planning component of the vehicle.

G: An example method includes: receiving a first mathematical model of a vehicle, the first mathematical model being based at least in part on a modal expansion of the vehicle; receiving a second mathematical model of the vehicle; determining, based at least in part on the first mathematical model and a current state of the vehicle, a first predicted future state of the vehicle; determining, based at least in part on the second mathematical model and the current state of the vehicle, a second predicted future state of the vehicle, determining a command for controlling an active suspension system based on the first predicted future state and the second predicted future state; and controlling the active suspension system based at least in part on the command.

H: The method of example G, wherein: the determining the first predicted future state comprises propagating the current state of the vehicle for a first time period; and the determining the second predicted future state comprises propagating the current state of the vehicle for a second time period shorter than the first time period.

I: The method of example G or example H, wherein: the second time period corresponds to an actuation cycle of the active suspension of the vehicle; and the first time period corresponds to five or more actuation cycles of the active suspension system of the vehicle.

J: The method of any one of example G through example I, further comprising: determining a first weighting factor for the first predicted future state; determining a second weighting factor for the second predicted future state; and determining the command based at least in part on the first weighting factor and the second weighting factor.

K: The method of any one of example G through example J, wherein the determining the first weighting factor corresponds to a periodic excitation of the vehicle and the second weighting factor corresponds to an impulse or steady state excitation of the vehicle.

L: The method of any one of example G through example K, wherein: the first weighting factor is relatively higher corresponding to an increased periodic excitation of the vehicle; and the second weighting factor is relatively higher corresponding to an increased impulse or steady state excitation of the vehicle.

M: The method of any one of example G through example L, further comprising: receiving information about at least one of a road characteristic or vehicle input data associated with at least one of a torque command, a braking command, or a steering command, wherein the periodic excitation or the impulse or steady state excitation is an expected excitation based at least in part on the road characteristic or the vehicle input data.

N: The method of any one of example G through example M, further comprising: receiving information about an object in an environment of the vehicle, wherein the second weighting factor is relatively higher when the object in the environment impacts travel of the vehicle.

O: The method of any one of example G through example N, wherein the modal expansion of the vehicle comprises at least one of node shape vectors associated with natural modes of the vehicle or time-dependent contribution vectors associated with the natural modes.

P: The method of any one of example G through example O, further comprising: determining the node shape vectors or the time-dependent contribution vectors; and extracting model parameters associated with the at least one of a mass, damping characteristics, or stiffness characteristics of the vehicle based on the node shape vectors or the time-dependent contribution vectors.

Q: An example vehicle includes: an active suspension system; one or more processors; and non-transitory computer readable media storing one or more instructions implemented by the one or more processors to perform actions comprising: receiving a first mathematical model of the vehicle, the first mathematical model being based at least in part on a modal expansion of the vehicle; receiving a second mathematical model of the vehicle; determining, based at least in part on the first mathematical model and a current state of the vehicle, a first predicted future state of the vehicle; determining, based at least in part on the second mathematical model and the current state of the vehicle, a second predicted future state of the vehicle, determining a command for controlling an active suspension system of the vehicle based on the first predicted future state and the second predicted future state; and controlling the active suspension system of the vehicle based at least in part on the command.

R: The vehicle of example Q, wherein: the determining the first predicted future state comprises propagating the current state of the vehicle for a first time period; and the determining the second predicted future state comprises propagating the current state of the vehicle for a second time period shorter than the first time period.

S: The vehicle of example Q or example R, the actions further comprising: determining a first weighting factor for the first predicted future state; determining a second weighting factor for the second predicted future state; and determining the command based at least in part on the first weighting factor and the second weighting factor.

T: The vehicle of any one of example Q through example S, wherein the determining the first weighting factor corresponds to a periodic excitation of the vehicle and the second weighting factor corresponds to an impulse or steady state excitation of the vehicle.

What is claimed is:

1. A vehicle comprising:
an active suspension system;
sensors;
one or more processors; and
non-transitory computer readable media storing one or more instructions implemented by the one or more processors to perform actions comprising:
receiving a first mathematical model of the vehicle, the first mathematical model being based at least in part on a modal expansion of the vehicle;
receiving a second mathematical model of the vehicle, the second mathematical model being based at least in part on a kinematic model of the vehicle;
receiving, from a sensor on the vehicle, sensor data about the vehicle;
determining, based at least in part on the sensor data, an estimation of a current state of the vehicle;
determining, based at least in part on the estimation and the first mathematical model, a first predicted future state of the vehicle;
determining, based at least in part on the estimation and the second mathematical model, a second predicted future state of the vehicle;
determining a command for controlling the active suspension system based on the first predicted future state and the second predicted future state; and
controlling the active suspension system based at least in part on the command.

2. The vehicle of claim 1, wherein:
the determining the command for controlling the active suspension system comprises determining a global optimization based on the first predicted future state over a first time period and determining a local optimization based on the second predicted future state over a second time period shorter than the first time period.

3. The vehicle of claim 2, wherein the second time period corresponds to an actuation cycle of the vehicle and the first time period is equal to five or more actuation cycles.

4. The vehicle of claim 1, the actions further comprising:
determining a first weighting factor for the first predicted future state and a second weighting factor for the second predicted future state; and
determining the command based at least in part on the first weighting factor and the second weighting factor.

5. The vehicle of claim 4, wherein the first weighting factor corresponds to a periodic excitation of the active suspension system and the second weighting factor corresponds to an impulse or steady state excitation of the active suspension system.

6. The vehicle of claim 1, wherein the first predicted future state or the second predicted future state is determined based at least in part on an expected excitation of the active suspension system as a result of a future state of the vehicle resulting from use of an autonomous planning component of the vehicle.

7. A method comprising:
receiving a first mathematical model of a vehicle, the first mathematical model being based at least in part on a modal expansion of the vehicle;
receiving a second mathematical model of the vehicle;
determining, based at least in part on the first mathematical model and a current state of the vehicle, a first predicted future state of the vehicle;
determining, based at least in part on the second mathematical model and the current state of the vehicle, a second predicted future state of the vehicle,
determining a command for controlling an active suspension system based on the first predicted future state and the second predicted future state; and
controlling the active suspension system based at least in part on the command.

8. The method of claim 7, wherein:
the determining the first predicted future state comprises propagating the current state of the vehicle for a first time period; and
the determining the second predicted future state comprises propagating the current state of the vehicle for a second time period shorter than the first time period.

9. The method of claim 8, wherein:
the second time period corresponds to an actuation cycle of the active suspension of the vehicle; and
the first time period corresponds to five or more actuation cycles of the active suspension system of the vehicle.

10. The method of claim 7, further comprising:
determining a first weighting factor for the first predicted future state;
determining a second weighting factor for the second predicted future state; and
determining the command based at least in part on the first weighting factor and the second weighting factor.

11. The method of claim 10, wherein the determining the first weighting factor corresponds to a periodic excitation of the vehicle and the second weighting factor corresponds to an impulse or steady state excitation of the vehicle.

12. The method of claim 11, wherein:
the first weighting factor is relatively higher corresponding to an increased periodic excitation of the vehicle; and
the second weighting factor is relatively higher corresponding to an increased impulse or steady state excitation of the vehicle.

13. The method of claim 11, further comprising:
receiving information about at least one of a road characteristic or vehicle input data associated with at least one of a torque command, a braking command, or a steering command,
wherein the periodic excitation or the impulse or steady state excitation is an expected excitation based at least in part on the road characteristic or the vehicle input data.

14. The method of claim 11, further comprising:
receiving information about an object in an environment of the vehicle,
wherein the second weighting factor is relatively higher when the object in the environment impacts travel of the vehicle.

15. The method of claim 11, wherein the modal expansion of the vehicle comprises at least one of node shape vectors associated with natural modes of the vehicle or time-dependent contribution vectors associated with the natural modes.

16. The method of claim 15, further comprising:
determining the node shape vectors or the time-dependent contribution vectors; and
extracting model parameters associated with the at least one of a mass, damping characteristics, or stiffness characteristics of the vehicle based on the node shape vectors or the time-dependent contribution vectors.

17. A vehicle comprising:
an active suspension system;
one or more processors; and
non-transitory computer readable media storing one or more instructions implemented by the one or more processors to perform actions comprising:
receiving a first mathematical model of the vehicle, the first mathematical model being based at least in part on a modal expansion of the vehicle;
receiving a second mathematical model of the vehicle;
determining, based at least in part on the first mathematical model and a current state of the vehicle, a first predicted future state of the vehicle;
determining, based at least in part on the second mathematical model and the current state of the vehicle, a second predicted future state of the vehicle,
determining a command for controlling an active suspension system of the vehicle based on the first predicted future state and the second predicted future state; and
controlling the active suspension system of the vehicle based at least in part on the command.

18. The vehicle of claim 17, wherein:
the determining the first predicted future state comprises propagating the current state of the vehicle for a first time period; and
the determining the second predicted future state comprises propagating the current state of the vehicle for a second time period shorter than the first time period.

19. The vehicle of claim 17, the actions further comprising:
determining a first weighting factor for the first predicted future state;
determining a second weighting factor for the second predicted future state; and
determining the command based at least in part on the first weighting factor and the second weighting factor.

20. The vehicle of claim 19, wherein the determining the first weighting factor corresponds to a periodic excitation of the vehicle and the second weighting factor corresponds to an impulse or steady state excitation of the vehicle.

* * * * *